United States Patent
Nelson et al.

(10) Patent No.: US 7,691,932 B2
(45) Date of Patent: *Apr. 6, 2010

(54) METHOD OF MAKING A COMPOSITION AND NANOCOMPOSITES THEREFROM

(75) Inventors: James M. Nelson, Roseville, MN (US); Ryan E. Marx, Cottage Grove, MN (US); John W. Longabach, Woodbury, MN (US); Kenneth J. Hanley, Eagan, MN (US); Mark E. Napierala, St. Paul, MN (US); Myles L. Brostrom, West Lakeland Township, MN (US); Jeffrey J. Cernohous, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 610 days.

This patent is subject to a terminal disclaimer.

(21) Appl. No.: 10/950,834

(22) Filed: Sep. 27, 2004

(65) Prior Publication Data

US 2006/0074167 A1    Apr. 6, 2006

(51) Int. Cl.
    *C08K 3/34* (2006.01)
(52) U.S. Cl. .................... 524/445; 524/447; 524/186
(58) Field of Classification Search ................. 524/445, 524/186, 447
    See application file for complete search history.

(56) References Cited

U.S. PATENT DOCUMENTS

| | | | |
|---|---|---|---|
| 3,252,757 A | 5/1966 | Granquist | |
| 3,666,407 A | 5/1972 | Orlemann | |
| 3,671,190 A | 6/1972 | Neumann | |
| 3,844,978 A | 10/1974 | Hickson | |
| 3,844,979 A | 10/1974 | Hickson | |
| 3,852,405 A | 12/1974 | Granquist | |
| 3,855,147 A | 12/1974 | Granquist | |
| 4,173,476 A | 11/1979 | Smith et al. | |
| 4,318,766 A | 3/1982 | Smith | |
| 4,378,277 A | 3/1983 | Smith | |
| 4,469,639 A | 9/1984 | Thompson, III et al. | |
| 4,820,778 A | 4/1989 | Ohtani et al. | |
| 4,985,486 A | 1/1991 | Westeppe et al. | |
| 5,122,571 A | 6/1992 | Westeppe et al. | |
| 5,206,284 A | 4/1993 | Fukui et al. | |
| 5,225,496 A | 7/1993 | Yamamoto et al. | |
| 5,244,970 A | 9/1993 | Kobayashi et al. | |
| 5,338,802 A | 8/1994 | DuBois et al. | |
| 5,374,688 A | 12/1994 | Besecke et al. | |
| 5,514,734 A | 5/1996 | Maxfield et al. | |
| 5,814,278 A | 9/1998 | Maistrovich et al. | |
| 5,840,796 A | 11/1998 | Badesha et al. | |
| 5,902,654 A | 5/1999 | Davidson et al. | |
| 5,910,523 A | 6/1999 | Hudson | |
| 5,939,184 A | 8/1999 | Inoue et al. | |
| 6,036,765 A | 3/2000 | Farrow et al. | |
| 6,060,549 A | 5/2000 | Li et al. | |
| 6,160,054 A | 12/2000 | Schwindeman et al. | |
| 6,184,338 B1 | 2/2001 | Schwindeman et al. | |
| 6,197,891 B1 | 3/2001 | Schwindeman et al. | |
| 6,221,991 B1 | 4/2001 | Letchford et al. | |
| 6,339,121 B1 | 1/2002 | Rafailovich et al. | |
| 6,379,791 B1 | 4/2002 | Cernohous et al. | |
| 6,391,326 B1 | 5/2002 | Crepeau et al. | |
| 6,395,386 B2 | 5/2002 | Bagrodia et al. | |
| 6,407,155 B1 | 6/2002 | Qian et al. | |
| 6,407,169 B1 | 6/2002 | Gauthier et al. | |
| 6,448,353 B1 | 9/2002 | Nelson et al. | |
| 6,464,122 B1 | 10/2002 | Tadauchi et al. | |
| 6,521,678 B1 | 2/2003 | Chaiko | |
| 6,541,557 B1 | 4/2003 | Hasegawa et al. | |
| 6,579,927 B1* | 6/2003 | Fischer | 524/445 |
| 6,589,299 B2 | 7/2003 | Missling et al. | |
| 6,630,239 B2 | 10/2003 | Cernohous et al. | |
| 6,716,935 B1 | 4/2004 | Nelson et al. | |
| 6,730,719 B2 | 5/2004 | Powell | |
| 6,753,373 B2* | 6/2004 | Winowiecki | 524/444 |
| 6,767,951 B2 | 7/2004 | Nair et al. | |
| 6,767,952 B2* | 7/2004 | Dontula et al. | 524/445 |
| 6,777,479 B1 | 8/2004 | Bernard et al. | |
| 6,969,490 B2 | 11/2005 | Marx et al. | |
| 6,969,491 B1 | 11/2005 | Marx et al. | |
| 7,022,780 B2 | 4/2006 | Marx et al. | |

(Continued)

FOREIGN PATENT DOCUMENTS

EP    0 427 344 A2    8/1991

(Continued)

OTHER PUBLICATIONS

Wang et al., "Poly(vinylidene fluoride-hexafluoropropylene)/organo-montmorillonite clays nanocomposite lithium polymer electrolytes", Electrochimica Acta, vol. 49, 2004, pp. 3595-3602.

Wu et al., "Structural, Thermao, and Electrical Characterization of Layered Nanocomposites, Derived from Na-Montmorillonite and Polyethers", Chem. Mater., vol. 5, 1993, pp. 835-838.

Declaration of Jeffrey J. Cernohous, dated Mar. 11, 2005.

Advincula et al., "Surface Initiated Polymerization (SIP) on Nanoparticle Surfaces: Demonstration of First Principles and Preparation of Nanocomposite Materials", Mat. Res. Soc. Symp. Proc. (2001), vol. 676, pp. Y3.44.1-Y3.44.6.

Chen et al., "Synthesis of Epoxy and Block Oligomer Modified Clay Nanocomposite", Mat. Res. Soc. Symp. Proc. (2002), vol. 703, pp. 547-550.

Lim et al, "Microstructure and Rheological Behavior of Block Copolymer/Clay Nanocomposites", Koren J. Chem. Eng. (2001), vol. 18(1), pp. 21-25.

(Continued)

*Primary Examiner*—Vickey Nerangis
(74) *Attorney, Agent, or Firm*—Bradford B. Wright; Daniel R. Pastirik

(57) ABSTRACT

A mixture of layered silicate, block copolymer having at least one block that is compatible with the first layered silicate, and a solvent is sheared while the solvent is removed.

22 Claims, 4 Drawing Sheets

U.S. PATENT DOCUMENTS

| | | | |
|---|---|---|---|
| 7,393,907 | B2 | 7/2008 | Imuta et al. |
| 7,495,051 | B2 | 2/2009 | Nelson et al. |
| 2002/0156207 | A1 | 10/2002 | Imuta et al. |
| 2003/0004250 | A1 | 1/2003 | Ajbani et al. |
| 2003/0022963 | A1 | 1/2003 | Parsons |
| 2003/0035756 | A1 | 2/2003 | Nelson et al. |
| 2003/0093107 | A1 | 5/2003 | Parsonage et al. |
| 2003/0100652 | A1 | 5/2003 | Kim et al. |
| 2003/0100655 | A1 | 5/2003 | Nair et al. |
| 2003/0114553 | A1 | 6/2003 | Karim et al. |
| 2004/0023016 | A1 | 2/2004 | Cernohous et al. |
| 2004/0023398 | A1 | 2/2004 | Nelson et al. |
| 2004/0024130 | A1 | 2/2004 | Nelson et al. |
| 2004/0059024 | A1 | 3/2004 | Reinking et al. |
| 2004/0162379 | A1 | 8/2004 | Ajbani et al. |
| 2004/0254268 | A1 | 12/2004 | Cernohous et al. |
| 2004/0265188 | A1 | 12/2004 | Marx et al. |
| 2005/0059765 | A1* | 3/2005 | Finch et al. ................ 524/430 |
| 2005/0256242 | A1 | 11/2005 | Ottaviani et al. |
| 2006/0047092 | A1 | 3/2006 | Marx et al. |
| 2006/0074169 | A1 | 4/2006 | Nelson et al. |
| 2006/0128867 | A1 | 6/2006 | Marx et al. |

FOREIGN PATENT DOCUMENTS

| | | |
|---|---|---|
| EP | 0 603 965 | 6/1994 |
| EP | 1 217 030 A2 | 6/2002 |
| EP | 1 310 528 | 5/2003 |
| EP | 1 384 750 A1 | 1/2004 |
| EP | 1 518 893 | 3/2005 |
| EP | 1 598 396 A1 | 11/2005 |
| JP | 2000-204214 | 7/2000 |
| JP | 2004-99830 | 4/2004 |
| KR | 2002-0015406 | 2/2002 |
| KR | 2003-0017216 | 3/2002 |
| KR | 2002-0050493 | 6/2002 |
| WO | WO 88/02048 | 3/1988 |
| WO | 1996/007522 | 3/1996 |
| WO | 1996/007674 | 3/1996 |
| WO | 1997/040929 | 11/1997 |
| WO | 1999/007790 | 1/1999 |
| WO | WO 99/41060 | 8/1999 |
| WO | WO 99/41299 | 8/1999 |
| WO | 2000/035969 | 6/2000 |
| WO | WO 00/53672 | 9/2000 |
| WO | WO 00/78540 A1 | 12/2000 |
| WO | WO 01/34685 A1 | 5/2001 |
| WO | 2001/058962 | 8/2001 |
| WO | 2002/068525 | 9/2002 |
| WO | 2002/094920 | 11/2002 |
| WO | 2003/022935 | 3/2003 |
| WO | WO 03/059817 A2 | 7/2003 |
| WO | 2004/011508 | 2/2004 |
| WO | 2004/041878 | 5/2004 |
| WO | 2004/054021 | 6/2004 |
| WO | 2004/060849 | 7/2004 |
| WO | 2004/063260 | 7/2004 |
| WO | WO 2004/074371 A1 | 9/2004 |
| WO | WO 2005/061623 A2 | 7/2005 |

OTHER PUBLICATIONS

Lee et al., "Linear Dynamic Viscoelastic Properties of Functionalized Block Copolymer/Organoclay Nanocomposites", Macromolecules (2003), vol. 36, No. 3, pp. 804-815.

Hou et al., "Clay Intercalation of Poly(styrene-ethylene oxide) Block Copolymers Studied by Two-Dimensional Solid-State NMR", Macromolecules (2003), vol. 36, No. 8, pp. 2769-2776.

Limary et al., "Stability of Diblock Copolymer/Layered Silicate Nanocomposite Thin Films", Macromolecules (2000), vol. 33, No. 14, pp. 5227-5234.

Mitchell et al., "Rheological Properties of Diblock Copolymer/Layered Silicate Nanocomposites", Journal of Polymer Science: Part B: Polymer Physics (2002), vol. 40, pp. 1434-1443.

Dortmans et al., "Reinforcement of a Porous PMMA Filter Material by Nanodispersed Clay", Advanced Engineering Materials (2001), vol. 3, No. 9, pp. 717-720.

Moreno et al., "Dielectric relaxation of poly(ethylenglycol)-b-poly(propylenglycol)-b-poly-ethylenglycol) copolymers above the glass transition temperature", Eur. Phys. J. E. (2001), vol. 4, pp. 173-182.

Groenewold et al., "Elastic interactions and stability of clay-filled lamellar phases", Eur. Phys. J. E. (2001), vol. 5, pp. 171-182.

Silva et al., "Templating of cylindrical and spherical block copolymer microdomains by layered silicates", Journal of Chemical Physics (Oct. 15, 2001), vol. 115, No. 15, pp. 7166-7174.

Zhang et al., "A novel property of styrene-butadiene-styrene/clay nanocomposites: radiation resistance", Journal of Materials Chemistry, vol. 14, pp. 209-213 (Published on Web Dec. 2, 2003).

Lee et al., "Alignment and orientational proliferation of HEX cylinders in a polystyrene-block-polyisoprene-block-polystyrene copolymer in the presence of clays", Polymer (Mar. 2003), vol. 44, No. 5, pp. 1705-1710.

Chen et al., "Poly(styrene-block-isoprene) Nanocomposites: Kinetics of Intercalation and Effects of Copolymer on Intercalation Behaviors", Journal of Polymer Science: Part B: Polymer Physics (Dec. 15, 2003), vol. 41 No. 24, pp. 3264-3271.

Zhao et al., "Preparation of Poly(styrene-block-butyl acrylate) Block Copolymer-Silicate Nanocomposites", Chem. Mater. (Jul. 15, 2003), vol. 15, No. 14, pp. 2693-2695.

Wang et al., "Melt-Processable Syndioactic Polystyrene/Montmorillonite Nanocomposites", Journal of Polymer Science: Part B: Polymer Physics (Dec. 15, 2003), vol. 41, No. 24, pp. 3173-3187.

ASTM D-1708-02a "Standard Test Method for Tensile Properties of Plastics By Use of Microtensile Specimens", Annual Book of ASTM Standards (2004), Section 8, vol. 08.01, pp. 394-398.

Runt et al., "Modified Biomedical Poly(Urethane) Block Copolymers: Nanocomposites and Polyisobutylene Comb Polymers", Polymer Preprints (2001), vol. 42, No. 2, pp. 99-100.

Jin et al., "Crystallization Behavior of Polyethylene Glycol Terephthalate/Polyethylene Glycol Intercalated Block Copolymers", Chemical Journal of Chinese Universities (May 2000), vol. 21, No. 5, pp. 801-804 (English Translation Included).

Antipov et al., "Composition and Deformation Behaviour of Nanocomposits on the Base of Low Density Polyethylene and Modified Clays", High-molecular compositions, Series A (2003), vol. 45, No. 11, pp. 1874-1884 (English Translation Included).

Finnefrock et al., "The Plumber's Nightmare: A New Morphology in Block Copolymer—Ceramic Nanocomposites and Mesoporous Aluminosilicates", J. Am. Chem. Soc., (Oct. 29, 2003), vol. 125, No. 43, pp. 13084-13093.

Garcia-Leiner et al., "Melt intercalation in Polymer-Clay nanocomposites promoted by supercritical Carbon Dioxide", Polymeric Materials, Science & Engineering (Sep. 7- 11, 2003), vol. 89, pp. 649-650.

Nelson et al., "Nanocomposite and Method of Making the Same", U.S. Appl. No. 10/950,932, filed Sep. 27, 2004.

Nelson et al., "Composition and Method of Making the Same", U.S. Appl. No. 10/950,934, filed Sep. 27, 2004.

Barclay et al., "The 'Living' Free Radical Synthesis of Poly(4-hydroxystyrene): Physical Properties and Dissolution Behavior", *Macromolecules*, vol. 31 (1998), 1024-1031.

Eisenberg, et al, Ed., "Coulombic Interactions in Macromolecular Systems" ACS Symposium Series 302, *American Chemical Society*, (1986) pp. 79-83.

Green et al., "Protective Groups in Organic Synthesis", Second Edition, John Wiley & Sons, Inc. New York, (1991) pp. 41, 80-83.

Hahn, "An Improved Method for the Diimide Hydrogenation of Butadiene and Isoprene Containing Polymers", *Journal of Polymer Science Part A*: Polymer Chemistry, vol. 30 (1992) pp. 397-408.

Hill, Jr. et al., "An Introduction to Chemical Engineering Kinetics & Reactor Design", *John Wiley & Sons*, New York (1977) pp. 251-252.

Hsieh et al., "Anionic Polymerization Principles and Practical Applications", *Marcel Dekker, Inc.* (1996) pp. 71-127.

Hsieh et al., "Anionic Polymerization Principles and Practical Applications", *Marcel Dekker, Inc.* (1996) pp. 333-368.

Hsieh et al., "Anionic Polymerization Principles and Practical Applications", *Marcel Dekker, Inc.* (1996) pp. 641-684.

Kesti, R., et al., "Homogeneous Ziegler-Natta Polymerization of Functionalized Monomers Catalyzed by Cationic Group IV Metallocenes", *J. Am. Chem. Soc.*, 1992 114, pp. 9679-9680.

Rachapudy et al., "Properties of Amorphous and Crystallizable Hydrocarbon Polymer. III. Studies of the Hydrogenation of Polybutadiene", *Journal of Polymer Science: Polymer Physics Edition*, vol. 17, (1979) pp. 1211-1222.

\* cited by examiner

METHOD OF MAKING A COMPOSITION AND NANOCOMPOSITES THEREFROM

BACKGROUND

Many materials have been added to polymeric resins to reinforce them. Such reinforced polymeric resins are generally referred to as composite materials or "composites". One popular type of such a reinforcing material is fiber. Flake and particulate materials have also been used to reinforce polymer matrices. In particular, a type of composite has emerged in recent years in which the reinforcing material has one or more dimensions on the order of a nanometer. Such a composite is known in the art as a "nanocomposite". One type of nanocomposite has an exfoliated layered silicate as the reinforcing material wherein the layered structure is broken down and individual silicate platelets are dispersed throughout the polymeric resin.

Layered silicates are typically composed of stacked silicate platelets. The silicate platelets typically have a thickness on the order of about one nanometer and typically have an aspect ratio of at least about 100. The spaces between these platelets are called gallery spaces. Under the proper conditions, the gallery spaces can be filled with monomer, oligomer, or polymer. This increases the distance between silicate platelets, swelling the layered silicate in a method termed intercalation. If the layered silicate swells so much that at least some of the individual silicate platelets are no longer organized into stacks, those individual silicate platelets are said to be "exfoliated".

SUMMARY

In one aspect, the present invention provides a method of making a composition, the method comprising:

mixing components comprising a first layered silicate having a first d-layer spacing, a block copolymer having at least one block that is compatible with the first layered silicate, and a solvent, wherein the first mixture contains at least 10 percent by weight of the solvent, based on the total weight of the first mixture;

masticating the first mixture in a vacuum kneader or extruder while removing at least a portion of the solvent from the first mixture to provide a second mixture, wherein the second mixture comprises the block copolymer having dispersed therein at least one of:

a) a second layered silicate having a second d-layer spacing that is greater than the first d-layer spacing; or b) exfoliated silicate platelets; and wherein the second mixture contains less than or equal to 5 percent by weight of the solvent, based on the total weight of the second mixture.

In one embodiment, the second mixture may be mixed with a polymeric resin to form a nanocomposite.

Methods according to the present invention typically provide a convenient and versatile method for manufacture of a wide variety of nanocomposite materials.

Unless otherwise indicated, d-layer spacing values refer to d-layer spacing values determined at 25° C.

As used herein, the term "block" refers to a portion of a block copolymer, comprising many monomeric units, that has at least one feature which is not present in the adjacent portions;

the term "block copolymer" refers to a copolymer composed of constitutionally different blocks in linear sequence;

the term "monomeric unit" refers to the largest constitutional unit contributed by a single monomer molecule to the structure of a polymer;

the phrase "compatible with the layered silicate" means capable of intercalating the layered silicate; and the term "exfoliated silicate platelet" refers to an individual silicate platelet that is less than about 5 nanometers thick and has an aspect ratio of at least about 10, and is not associated as a face-to-face stack with at least one other such silicate platelet, regardless of whether the silicate platelet was made by exfoliating a layered silicate or by some other method.

DETAILED DESCRIPTION

Figure 1:
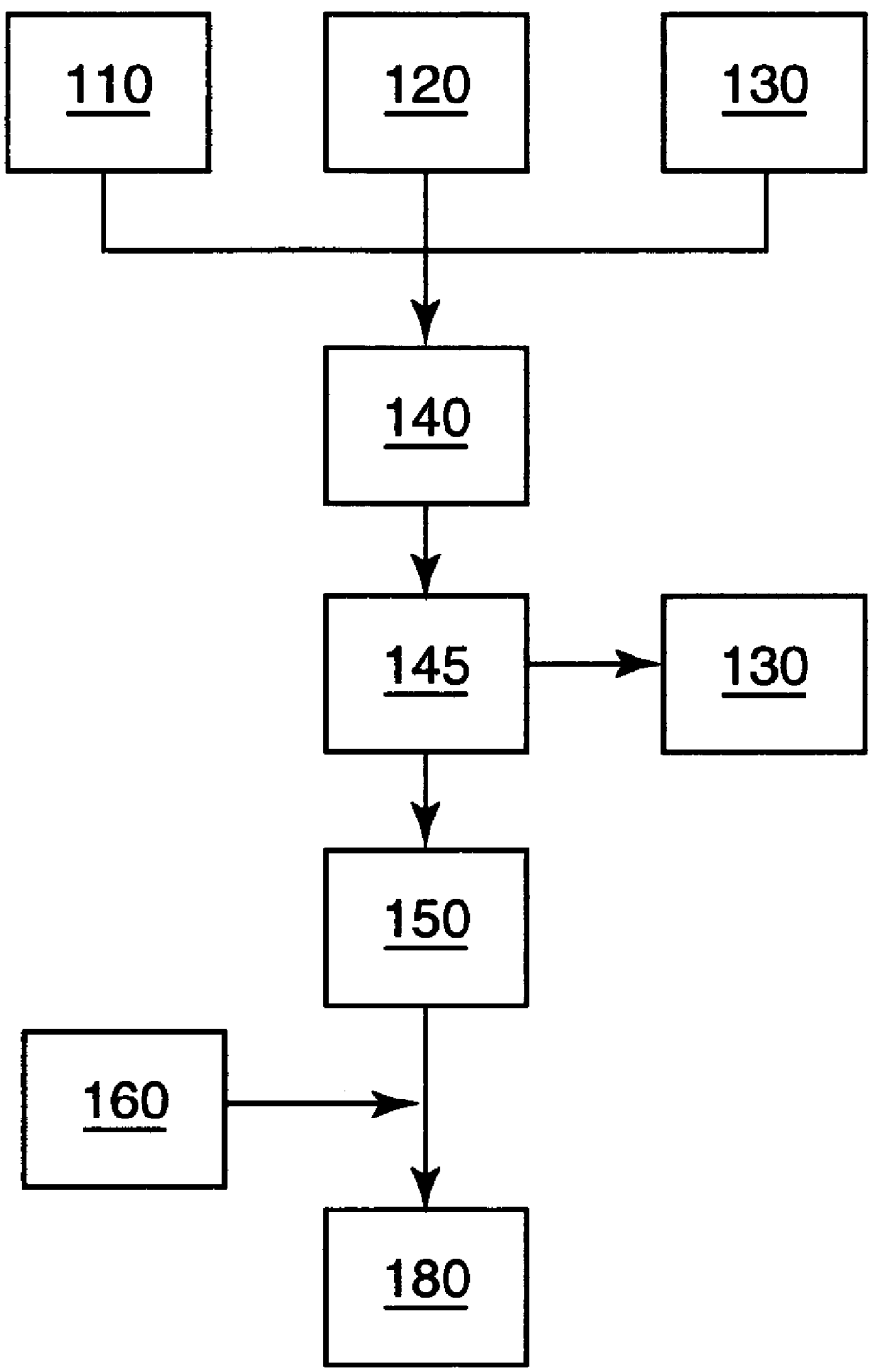
FIG. 1 is a process flow diagram according to one exemplary embodiment of the present invention.
Figure 2:
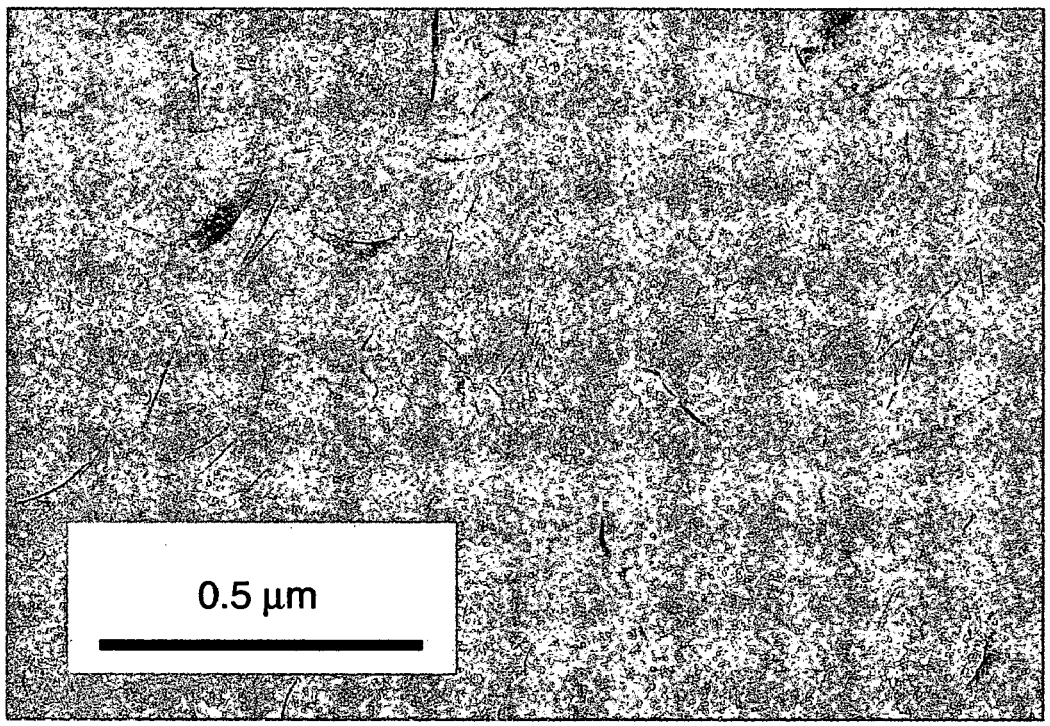
FIG. 2 is a TEM micrograph of Nanocomposite 1 in Example 5.
Figure 3:
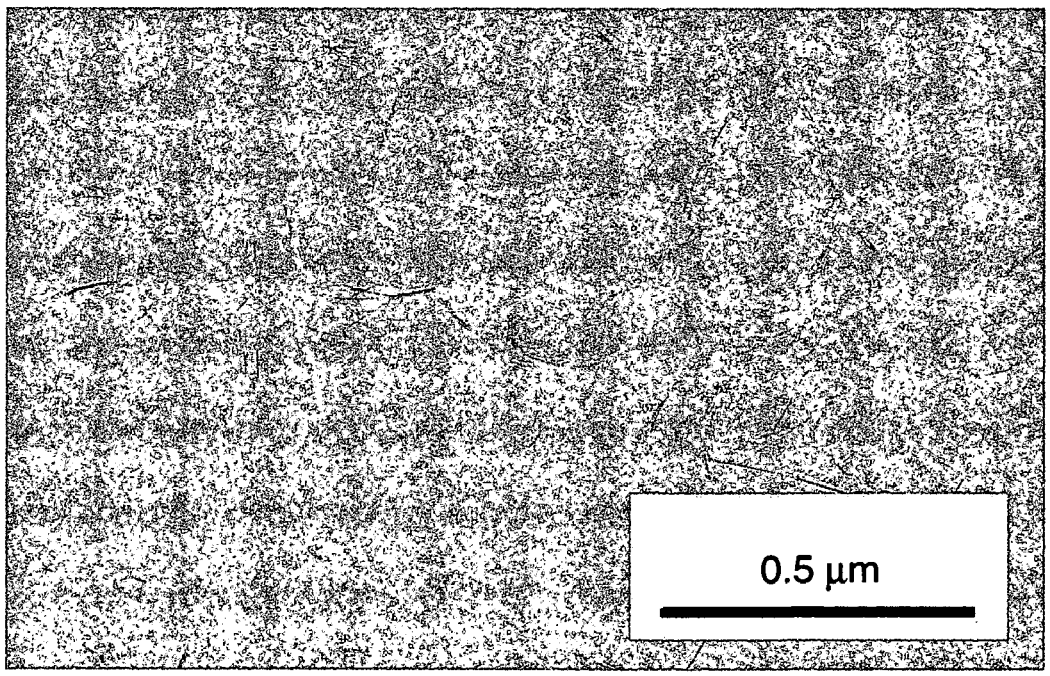
FIG. 3 is a TEM micrograph of Nanocomposite 2 in Example 6.
Figure 4:
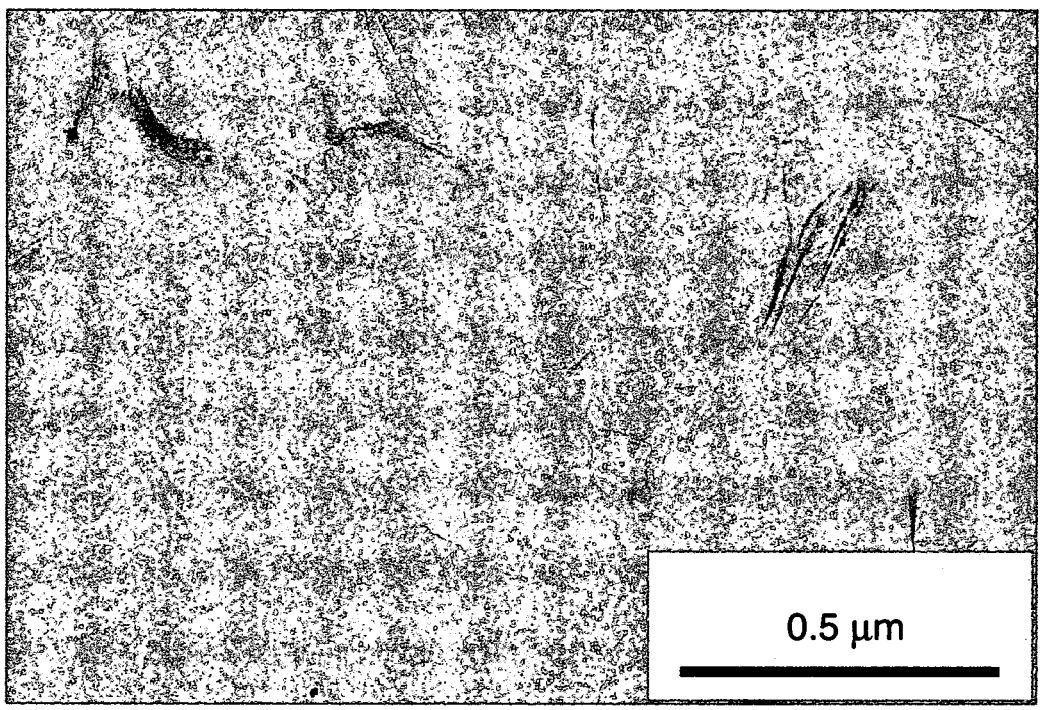
FIG. 4 is a TEM micrograph of Nanocomposite 3 in Example 7.
Figure 5:
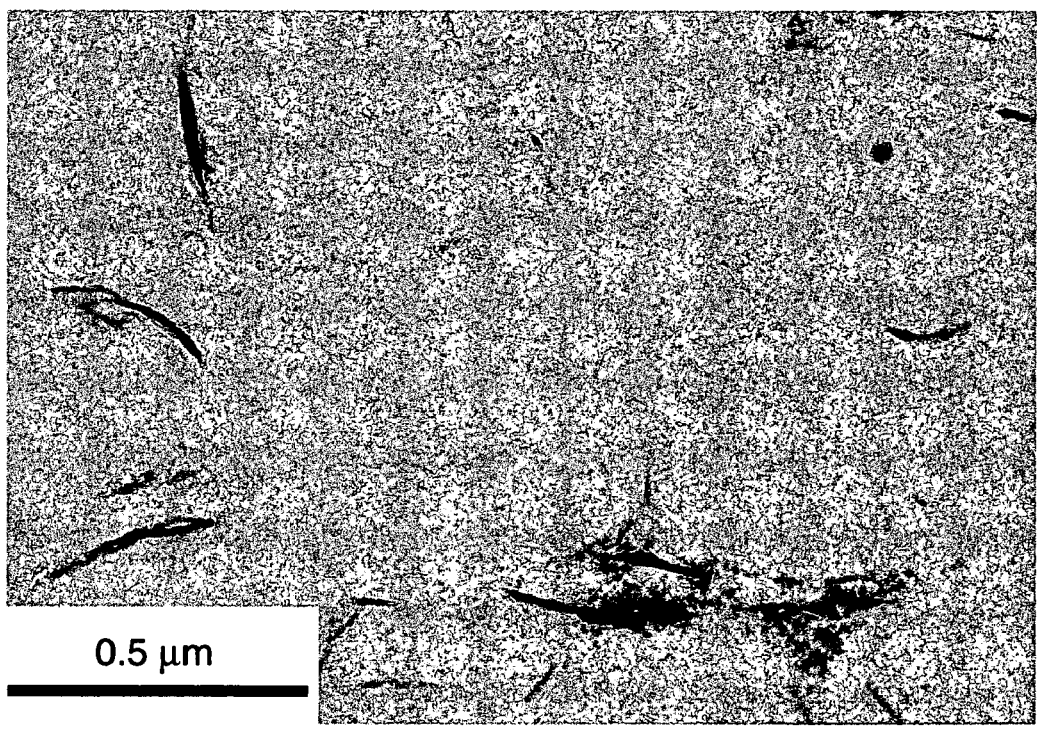
FIG. 5 is a TEM micrograph of Nanocomposite 4 in Example 8.

One exemplary embodiment of the process is shown in FIG. 1, wherein layered silicate 110, block copolymer 120, and solvent 130 are mixed together to form first mixture 140. First mixture 140 is then masticated in a suitable apparatus 145 (i.e., a kneader or extruder) while solvent 130 is removed from it resulting in second mixture 150. Second mixture 150 is then combined with fluid polymeric resin 160 resulting in nanocomposite 180.

Useful layered silicates that may be used as the first layered silicate according to the present invention include, for example, natural phyllosilicates, synthetic phyllosilicates, organically modified phyllosilicates (e.g., organoclays), and combinations thereof.

Examples of natural phyllosilicates include smectite and smectite-type clays such as montmorillonite, nontronite, bentonite, beidellite, hectorite, saponite, sauconite, fluorohectorite, stevensite, volkonskoite, magadiite, kenyaite, halloysite, and hydrotalcite.

Suitable synthetic phyllosilicates include, for example, those prepared by hydrothermal processes as disclosed in U.S. Pat. Nos. 3,252,757 (Granquist); 3,666,407 (Orlemann); 3,671,190 (Neumann); 3,844,978 (Hickson); 3,844,979 (Hickson); 3,852,405 (Granquist); and 3,855,147 (Granquist). Commercially available synthetic smectite clays are commercially available, for example, from Southern Clay Products, Inc., Gonzales, Tex., under the trade designation "LAPONITE" including, for example, "LAPONITE B" (a synthetic layered fluorosilicate), "LAPONITE D" (a synthetic layered magnesium silicate), and "LAPONITE RD" (a synthetic layered silicate).

Organoclays are typically smectite or smectite-type clays produced by interacting the unfunctionalized clay with one or more suitable intercalants. These intercalants are typically organic compounds, which are neutral or ionic. Useful neutral organic intercalants include polar compounds such as amides, esters, lactams, nitriles, ureas, carbonates, phosphates, phosphonates, sulfates, sulfonates, nitro compounds, and the like. The neutral organic intercalants can be monomeric, oligomeric or polymeric. Neutral organic intercalants may intercalate into the layers of the clay through hydrogen bonding without completely replacing the original charge balancing ions. Useful ionic intercalants are typically cationic surfactants such as, for example, onium compounds such as ammonium (primary, secondary, tertiary, and quaternary), phosphonium, or sulfonium derivatives of aliphatic, aromatic or aliphatic amines, phosphines and sulfides. Useful onium ions include, for example, quaternary ammonium ions having at least one long chain aliphatic group (e.g., octadecyl, myristyl, or oleyl) bound to the quaternary nitrogen atom. Further details concerning organoclays and methods for their preparation may be found, for example, in U.S. Pat. Nos. 4,469,639 (Thompson et al.); 6,036,765 (Farrow et al.); and 6,521,678B1 (Chaiko).

A variety of organoclays are available from commercial sources. For example, Southern Clay Products offers various organoclays under the trade designations "CLOISITE" (derived from layered magnesium aluminum silicate) and "CLAYTONE" (derived from natural sodium bentonite) including "CLAYTONE HY", "CLAYTONE AF", "CLOISITE 6A" (modifier concentration of 140 meq/100 g), "CLOISITE 15A" (modifier concentration of 125 meq/100 g), and "CLOISITE 20A" (modifier concentration of 95 meq/100 g). Organoclays are also available commercially from Nanocor, Arlington Heights, Ill., under the trade designation "NANOMER".

Typically, layered silicates exhibit a d-layer spacing that can be determined by well-known techniques such as X-ray diffraction (XRD) and/or transmission electron microscopy (TEM). During the method of the present invention the d-layer spacing typically increases as intercalation between individual silicate layers by the block copolymer proceeds until the layers become so widely separated that they are considered exfoliated and no d-layer spacing is observable by XRD or TEM.

Block copolymers are generally formed by sequentially polymerizing different monomers. Useful methods for forming block copolymers include, for example, anionic, cationic, coordination, and free radical polymerization methods.

Useful block copolymers may have any number of blocks greater than or equal to two (e.g., di-, tri-, tetra-block copolymers), and may have any form such as, for example, linear, star, comb, or ladder. Generally, at least one block should have an affinity for the chosen layered silicate (including organoclay). This block may be hydrophilic or hydrophobic (e.g., when using organoclays) in nature. Typically, the block copolymer is thermoplastic, although the polymer may not be thermoplastic as long as it is capable of intercalating the layered silicate. For example, the block copolymer may be liquid.

Hydrophilic blocks typically have one or more polar moieties such as, for example, acids (e.g., —CO$_2$H, —SO$_3$H, —PO$_3$H); —OH; —SH; primary, secondary, or tertiary amines; ammonium N-substituted or unsubstituted amides and lactams; N-substituted or unsubstituted thioamides and thiolactams; anhydrides; linear or cyclic ethers and polyethers; isocyanates; cyanates; nitriles; carbamates; ureas; thioureas; heterocyclic amines (e.g., pyridine or imidazole)). Useful monomers that may be used to introduce such groups include, for example, acids (e.g., acrylic acid, methacrylic acid, itaconic acid, maleic acid, fumaric acid, and including methacrylic acid functionality formed via the acid catalyzed deprotection of t-butyl methacrylate monomeric units as described in U.S. Pat. Publ. No. "2004/0024130" (Nelson et al.)); acrylates and methacrylates (e.g., 2-hydroxyethyl acrylate), acrylamide and methacrylamide, N-substituted and N,N-disubstituted acrylamides (e.g., N-t-butylacrylamide, N,N-(dimethylamino)ethylacrylamide, N,N-dimethylacrylamide, N,N-dimethylmethacrylamide), N-ethylacrylamide, N-hydroxyethylacrylamide, N-octylacrylamide, N-t-butylacrylamide, N,N-dimethylacrylamide, N,N-diethylacrylamide, and N-ethyl-N-dihydroxyethylacrylamide), aliphatic amines (e.g., 3-dimethylaminopropyl amine, N,N-dimethylethylenediamine); and heterocyclic monomers (e.g., 2-vinylpyridine, 4-vinylpyridine, 2-(2-aminoethyl)pyridine, 1-(2-aminoethyl)pyrrolidine, 3-aminoquinuclidine, N-vinylpyrrolidone, and N-vinylcaprolactam).

Hydrophobic blocks typically have one or more hydrophobic moieties such as, for example, aliphatic and aromatic hydrocarbon moieties such as those having at least about 4, 8, 12, or even 18 carbon atoms; fluorinated aliphatic and/or fluorinated aromatic hydrocarbon moieties, such as for example, those having at least about 4, 8, 12, or even 18 carbon atoms; and silicone moieties.

Useful monomers for introducing such blocks include, for example: hydrocarbon olefins such as, for example, ethylene, propylene, isoprene, styrene, and butadiene; cyclic siloxanes such as for example, decamethylcyclopentasiloxane and decamethyltetrasiloxane; fluorinated olefins such as for example, tetrafluoroethylene, hexafluoropropylene, trifluoroethylene, difluoroethylene, and chlorofluoroethylene; non-fluorinated alkyl acrylates and methacrylates such as for example, butyl acrylate, isooctyl methacrylate lauryl acrylate, stearyl acrylate; fluorinated acrylates such as, for example, perfluoroalkylsulfonamidoalkyl acrylates and methacrylates having the formula H$_2$C=C(R$_2$)C(O)O—X—N(R)SO$_2$R$_f'$ wherein: R$_f'$ is —C$_6$F$_{13}$, —C$_4$F$_9$, or —C$_3$F$_7$; R is hydrogen, C$_1$ to C$_{10}$ alkyl, or C$_6$-C$_{10}$ aryl; and X is a divalent connecting group. Examples include C$_4$F$_9$SO$_2$N(CH$_3$)C$_2$H$_4$OC(O)NH(C$_6$H$_4$)CH$_2$C$_6$H$_4$NHC(O)OC$_2$H$_4$OC(O)CH=CH$_2$ or

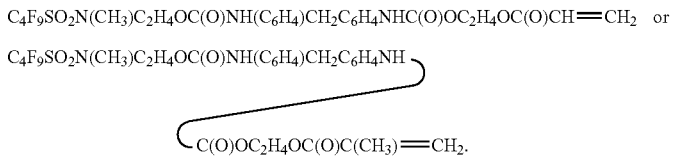

Such monomers may be readily obtained from commercial sources or prepared, for example, according to the procedures in U.S. Pat. Appl. Publ. No. 2004/0023016 (Cernohous et al.), the disclosure of which is incorporated herein by reference.

Examples of useful block copolymers having hydrophobic and hydrophilic blocks include poly(isoprene-block-4-vinylpyridine); poly(isoprene-block-methacrylic acid); poly(isoprene-block-N,N-(dimethylamino)ethyl acrylate); poly(isoprene-block-2-diethylaminostyrene); poly(isoprene-block-glycidyl methacrylate); poly(isoprene-block-2-hydroxyethyl methacrylate); poly(isoprene-block-N-vinylpyrrolidone); poly(isoprene-block-methacrylic anhydride); poly(isoprene-block-(methacrylic anhydride-co-methacrylic acid)); poly(styrene-block-4-vinylpyridine); poly(styrene-block-2-vinylpyridine); poly(styrene-block-acrylic acid); poly(styrene-block-methacrylamide); poly(styrene-block-N-(3-aminopropyl)methacrylamide); poly(styrene-block-N,N-(dimethylamino)ethyl acrylate); poly(styrene-block-2-diethylaminostyrene); poly(styrene-block-glycidyl methacrylate); poly(styrene-block-2-hydroxyethyl methacrylate); poly(styrene-block-N-vinylpyrrolidone copolymer); poly(styrene-block-isoprene-block-4-vinylpyridine); poly(styrene-block-isoprene-block-glycidyl methacrylate); poly(styrene-block-isoprene-block-methacrylic acid); poly(styrene-block-isoprene-block-(methacrylic anhydride-co-methacrylic acid)); poly(styrene-block-isoprene-block-methacrylic anhydride); poly(butadiene-block-4-vinylpyridine); poly(butadiene-block-methacrylic acid); poly(butadiene-block-N,N-(dimethylamino)ethyl acrylate); poly(butadiene-block-2-diethylaminostyrene); poly(butadiene-block-glycidyl methacrylate); poly(butadiene-block-2-hydroxyethyl methacrylate); poly(butadiene-block-N-vinylpyrrolidone); poly(butadiene-block-methacrylic anhydride); poly(butadiene-block-(methacrylic anhydride-co-methacrylic acid); poly(styrene-block-butadiene-block-4-vinylpyridine); poly(styrene-block-butadiene-block-methacrylic acid); poly(styrene-block-butadiene-block-N,N-(dimethylamino)ethyl acrylate); poly(styrene-block-butadiene-block-2-diethylaminostyrene); poly(styrene-block-butadiene-block-glycidyl methacrylate); poly(styrene-block-butadiene-block-2-hydroxyethyl methacrylate); poly(styrene-block-butadiene-block-N-vinylpyrrolidone); poly(styrene-block-butadiene-block-methacrylic anhydride); poly(styrene-block-butadiene-block-(methacrylic anhydride-co-methacrylic acid)); and hydrogenated forms of poly(butadiene-block-4-vinylpyridine), poly(butadiene-block-methacrylic acid), poly(butadiene-block-N,N-(dimethylamino)ethyl acrylate), poly(butadiene-block-2-diethylaminostyrene), poly(butadiene-block-glycidyl methacrylate), poly(butadiene-block-2-hydroxyethyl methacrylate), poly(butadiene-block-N-vinylpyrrolidone), poly(butadiene-block-methacrylic anhydride), poly(butadiene-block-(methacrylic anhydride-co-methacrylic acid)), poly(isoprene-block-4-vinylpyridine), poly(isoprene-block-methacrylic acid), poly(isoprene-block-N,N-(dimethylamino)ethyl acrylate), poly(isoprene-block-2-diethylaminostyrene), poly(isoprene-block-glycidyl methacrylate), poly(isoprene-block-2-hydroxyethyl methacrylate), poly(isoprene-block-N-vinylpyrrolidone), poly(isoprene-block-methacrylic anhydride), poly(isoprene-block-(methacrylic anhydride-co-methacrylic acid)), poly(styrene-block-isoprene-block-glycidyl methacrylate), poly(styrene-block-isoprene-block-methacrylic acid), poly(styrene-block-isoprene-block-methacrylic anhydride-co-methacrylic acid), styrene-block-isoprene-block-methacrylic anhydride, poly(styrene-block-butadiene-block-4-vinylpyridine), poly(styrene-block-butadiene-block-methacrylic acid), poly(styrene-block-butadiene-block-N,N-(dimethylamino)ethyl acrylate), poly(styrene-block-butadiene-block-2-diethylaminostyrene), poly(styrene-block-butadiene-block-glycidyl methacrylate), poly(styrene-block-butadiene-block-2-hydroxyethyl methacrylate), poly(styrene-block-butadiene-block-N-vinylpyrrolidone), poly(styrene-block-butadiene-block-methacrylic anhydride), poly(styrene-block-butadiene-block-(methacrylic anhydride-co-methacrylic acid), poly(MeFBSEMA-block-methacrylic acid) (wherein "MeFBSEMA" refers to 2-(N-methylperfluorobutanesulfonamido)ethyl methacrylate, e.g., as available from 3M Company, Saint Paul, Minn.), poly(MeFBSEMA-block-t-butyl methacrylate), poly(styrene-block-t-butyl methacrylate-block-MeFBSEMA), poly(styrene-block-methacrylic anhydride-block-MeFBSEMA), poly(styrene-block-methacrylic acid-block-MeFBSEMA), poly(styrene-block-(methacrylic anhydride-co-methacrylic acid)-block-MeFBSEMA)), poly(styrene-block-(methacrylic anhydride-co-methacrylic acid-co-MeFBSEMA)), poly(styrene-block-(t-butyl methacrylate-co-MeFBSEMA)), poly(styrene-block-isoprene-block-t-butyl methacrylate-block-MeFBSEMA), poly(styrene-isoprene-block-methacrylic anhydride-block-MeFBSEMA), poly(styrene-isoprene-block-methacrylic acid-block-MeFBSEMA), poly(styrene-block-isoprene-block-(methacrylic anhydride-co-methacrylic acid)-block-MeFBSEMA), poly(styrene-block-isoprene-block-(methacrylic anhydride-co-methacrylic acid-co-MeFBSEMA)), poly(styrene-block-isoprene-block-(t-butyl methacrylate-co-MeFBSEMA)), poly(MeFBSEMA-block-methacrylic anhydride), poly(MeFBSEMA-block-(methacrylic acid-co-methacrylic anhydride)), poly(styrene-block-(t-butyl methacrylate-co-MeFBSEMA)), poly(styrene-block-butadiene-block-t-butyl methacrylate-block-MeFBSEMA), poly(styrene-butadiene-block-methacrylic anhydride-block-MeFBSEMA), poly(styrene-butadiene-block-methacrylic acid-block-MeFBSEMA), poly(styrene-block-butadiene-block-(methacrylic anhydride-co-methacrylic acid)-block-MeFBSEMA), poly(styrene-block-butadiene-block-(methacrylic anhydride-co-methacrylic acid-co-MeFBSEMA)), and poly(styrene-block-butadiene-block-(t-butyl methacrylate-co-MeFBSEMA)).

Generally, the block copolymer should be chosen such that at least one block is capable of intercalating the layered silicate. For natural and synthetic layered silicates, this typically means that at least one block should be hydrophilic, while in the case of organoclays the block may be hydrophilic or hydrophobic. The choice of remaining blocks of the block copolymer will typically be directed by the nature of any polymeric resin with which the second mixture will be subsequently combined.

Any amount of block copolymer may be used, however, typically the block copolymer is included in an amount in a range of 0.01 to 10 parts or more by weight for every part of the layered silicate included in the first mixture. More typically, the block copolymer is included in an amount in a range of 0.05 to 2 parts or more by weight for every part of the layered silicate included in the first mixture.

Useful solvents include, for example, organic solvents, water, and combinations thereof. Examples of organic solvents include esters (e.g., ethyl acetate, butyl acetate, beta-ethoxyethyl acetate, beta-butoxy-beta-ethoxyethyl acetate, methylcellosolve acetate, cellosolve acetate, diethylene glycol monoacetate, methoxytriglycol acetate, and sorbitol acetate), ketones (e.g., methyl isobutyl ketone, 2-butanone, acetonylacetone, and acetone), aromatic hydrocarbons (e.g., benzene, toluene, and xylene), aliphatic hydrocarbons (e.g., cyclohexane, heptane, octane, decane, and dodecane), nitriles (e.g., acetonitrile), ethers (e.g., tetrahydrofuran, dioxane, and diglyme), alcohols (e.g., methanol, ethanol, isopropanol, butanol, octanol, decanol, butylcarbitol, methylcarbitol, diethylene glycol, dipropylene glycol, ethylene glycol, propylene glycol, ethylene glycol monomethyl ether, ethylene glycol monobutyl ether, and diacetone alcohol), halocarbons (e.g., carbon tetrachloride, methylene chloride, trifluorotoluene, and chloroform), and combinations thereof. In one embodiment, the solvent may be essentially free of (i.e., contain less than about one percent of) water.

Without wishing to be bound by theory, it is believed that one role of the solvent is as a lubricant that aids in dispersing the layered silicate and/or exfoliated silicate platelets in the block copolymer. However, it is surprisingly discovered that the solvent need not be selected based on its ability to swell the layered silicate or even the block copolymer. Thus, in some embodiments according to the present invention, the solvent may be selected such that it does not swell the layered silicate. In another embodiment, the solvent may be selected such that it does not swell the block copolymer.

The solvent is at least partially removed under shear. Typically, this may be done by connecting a vacuum pump or other device for reducing pressure to the shearing apparatus used to carry out the process. Before removal of the solvent, the mixture of the solvent, block copolymer, and layered silicate contains at least 10 percent by weight of solvent, based on the total weight of the mixture. For example, the mixture may contain at least 10, 20, 30, 40, 50, 60, 70, 80, or even at least 90 percent or more by weight of solvent, based on the total weight of the mixture.

After removal, the processed mixture contains less than or equal to 5 percent by weight of solvent, based on the total weight of the second mixture. For example, the second mixture may contain less than or equal to 4, 3, 2, 1, or even less than 0.1 percent by weight of solvent, based on the total weight of the second mixture. More typically, solvent levels that are achievable according to the method of the present invention are in a range of from about 0.2 to about 0.5 percent by weight of solvent, based on the total weight of the second mixture.

As intercalation and/or exfoliation occur during the method of the present invention, the weight of the first layered silicate (i.e., the layered silicate having the first d-layer spacing) decreases to less than twenty percent of its initial weight before removal compounding with the block copolymer and solvent (i.e., first weight). For example, the amount of the first layered silicate may decrease, during mixing and at least partial removal of solvent, to a weight that is less than 20, 15, 10, 5, or even less than 1 percent or less of the initial weight.

In order to achieve intercalation and/or exfoliation the first mixture is masticated during at least partial removal of the solvent. Equipment that is useful for masticating the first mixture includes, for example, vacuum kneaders and extruders. Such equipment is well known and/or readily commercially available; typically equipped with devolatilizing capabilities (e.g., vacuum ports) and/or temperature-controlled zones. The equipment may have a single port (other than any vacuum ports) for introducing and extracting material, or it may have separate inlet and outlet ports as in the case of an extruder or high viscosity processor.

One example of a suitable high viscosity processor (i.e., a kneader), typically supplied with vacuum equipment, is a high viscosity processor marketed under the trade designation "DISCOTHERM B" by List USA, Inc., Acton, Mass. This high viscosity processor provides intensive mixing and kneading in combination with large heat-transfer surfaces and long residence times. The heat transfer surfaces are continuously swept by kneading elements, which increases thermal efficiency and ensures high heat transfer rates. The inner cavity also has a relatively large working volume (i.e., volume occupied by the reaction mixture) and fill level, thus allowing for high throughput and long retention times. Yet, the working volume occupies only about 60 percent of the total volume of the reactor, which provides ample room to allow for disengagement and flashing of off-gases and vapors as they are brought to the bulk surface by the intensive mixing.

Another example of a suitable kneader, fitted with a vacuum system, is that marketed by IKA Works, Inc., Wilmington, N.C., under the trade designation "MKD 0,6-H 60 HIGH-PERFORMANCE MEASURING KNEADER".

Another example of a suitable high performance kneader is commercially available under the trade designation "SRUGO SIGMA KNEADER" from Srugo Machines Engineering, Netivot, Israel. This kneader can be connected to vacuum equipment by vacuum ports on the kneader.

Useful extruders include, for example, single- and multiple-screw extruders and reciprocating extruders. Examples of suitable extruders include those marketed by Coperion Buss AG, Pratteln, Switzerland, under the trade designation "MKS", for example, "MKS 30".

The extent of intercalation and/or exfoliation of the layered silicate can typically be controlled in large part through variables including, for example, concentration or composition of components, pressure (i.e., vacuum) in the mixing apparatus, the temperature profile of the process (e.g., isothermal or ramped), screw design, order of addition of materials, the level of applied shear force and/or rate, and the duration of the mixing process. For example, intercalation and/or exfoliation may typically be enhanced by increasing the temperature or reducing the rate of solvent removal (e.g., by lessening the degree of an applied vacuum). In selecting the temperature, the physical properties and chemical properties of the solvent, first layered silicate, and block copolymer should be considered, for example, such that decomposition of the first layered silicate and/or block copolymer may be kept at a relatively low level. Such variables may be modified in a continuous or stepwise manner, or they may be maintained at a constant level. To aid in processing, the temperature of kneader or extruder is typically kept above the glass transition temperature and/or melting temperature of the block copolymer, although this is not a requirement.

Surprisingly, it is discovered according to the present invention that the solvent may serve as a lubricant for the masticating process and need not be capable of swelling the first layered silicate and/or the block copolymer under the process conditions.

In some embodiments, the second mixture may be mixed with (i.e., let down in) a polymeric resin or mixture of polymeric resins. In one embodiment, the second mixture may comprise a masterbatch that typically has a relatively high content of intercalated layered silicates and/or exfoliated silicate platelets. For example, the total amount of the second layered silicate and exfoliated silicate platelets in the masterbatch may comprise at least 30, 40, 50, 60 percent by weight or more of the second mixture.

Mixing of mixture comprising the second mixture with the polymeric resin may be accomplished by any suitable technique, typically depending on the nature of the polymeric resin. Such techniques include for example, extruding, stirring, and kneading, optionally in the presence of a solvent.

The second mixture and/or polymeric resin may be added, for example, in granular form or in fluid (e.g., molten form). In one useful embodiment, the second mixture is combined with a fluid polymeric resin within the body of a screw extruder, whereupon it forms a fluid (e.g., molten) nanocomposite material that may be solidified (e.g., by cooling or curing) after extraction from the extruder, although other methods of combining the polymeric resin and second mixture may also be used.

Any amount of the second mixture may be let down into any amount of polymeric resin, for example, depending on the intended physical properties of the resultant nanocomposite. For example, the weight ratio of the polymeric resin to the block copolymer may be in a range of 20 to 200, inclusive.

Any organic polymeric resin may be used in practice of the present invention. For example, useful polymeric resins may be thermoplastic, thermosetting, or a combination thereof. Typically, methods according to the present invention are well suited for use with thermoplastic polymeric resins.

Useful thermoplastic polymeric resins include, for example: polylactones such as, for example, poly(pivalolactone) and poly(caprolactone); polyurethanes such as, for example, those derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, or 4,4'-diisocyanatodiphenylmethane with linear long-chain diols such as poly(tetramethylene adipate), poly(ethylene adipate), poly(1,4-butylene adipate), poly(ethylene succinate), poly(2,3-butylenesuccinate), polyether diols and the like; polycarbonates such as poly(methane bis(4-phenyl) carbonate), poly(1,1-ether bis(4-phenyl) carbonate), poly(diphenylmethane bis(4-phenyl)carbonate), poly(1,1-cyclohexane bis(4-phenyl)carbonate), or poly(2,2-(bis4-hydroxyphenyl) propane) carbonate; polysulfones; polyether ether ketones; polyamides such as, for example, poly(4-aminobutyric acid), poly(hexamethylene adipamide), poly(6-aminohexanoic acid), poly(m-xylylene adipamide), poly(p-xylylene sebacamide), poly(metaphenylene isophthalamide), and poly(p-phenylene terephthalamide); polyesters such as, for example, poly(ethylene azelate), poly(ethylene-1,5-naphthalate), poly(ethylene-2,6-naphthalate), poly(1,4-cyclohexane dimethylene terephthalate), poly(ethylene oxybenzoate), poly(para-hydroxy benzoate), poly(1,4-cyclohexylidene dimethylene terephthalate) (cis), poly(1,4-cyclohexylidene dimethylene terephthalate) (trans), polyethylene terephthalate, and polybutylene terephthalate; poly(arylene oxides) such as, for example, poly(2,6-dimethyl-1,4-phenylene oxide) and poly(2,6-diphenyl-1,1phenylene oxide); poly(arylene sulfides) such as, for example, polyphenylene sulfide; polyetherimides; vinyl polymers and their copolymers such as, for example, polyvinyl acetate, polyvinyl alcohol, polyvinyl chloride, polyvinyl butyral, polyvinylidene chloride, and ethylene-vinyl acetate copolymers; acrylic polymers such as, for example, poly(ethyl acrylate), poly(n-butyl acrylate), poly(methyl methacrylate), poly(ethyl methacrylate), poly(n-butyl methacrylate), poly(n-propyl methacrylate), polyacrylamide, polyacrylonitrile, polyacrylic acid, ethylene-ethyl acrylate copolymers, ethylene-acrylic acid copolymers; acrylonitrile copolymers (e.g., poly(acrylonitrile-co-butadiene-co-styrene) and poly(styrene-co-acrylonitrile)); styrenic polymers such as, for example, polystyrene, poly(styrene-co maleic anhydride) polymers and their derivatives, methyl methacrylate-styrene copolymers, and methacrylated butadiene-styrene copolymers; polyolefins such as, for example, polyethylene, polybutylene, polypropylene, chlorinated low density polyethylene, poly(4-methyl-1-pentene); ionomers; poly(epichlorohydrins); polysulfones such as, for example, the reaction product of the sodium salt of 2,2-bis(4-hydroxyphenyl) propane and 4,4'-dichlorodiphenyl sulfone; furan resins such as, for example, poly(furan); cellulose ester plastics such as, for example, cellulose acetate, cellulose acetate butyrate, and cellulose propionate; protein plastics; polyarylene ethers such as, for example, polyphenylene oxide; polyimides; polyvinylidene halides; polycarbonates; aromatic polyketones; polyacetals; polysulfonates; polyester ionomers; and polyolefin ionomers. Copolymers and/or combinations of these aforementioned polymers can also be used.

Useful thermoplastic elastomeric polymeric resins include, for example, polybutadiene, polyisobutylene, ethylene-propylene copolymers, ethylene-propylene-diene terpolymers, sulfonated ethylene-propylene-diene terpolymers, polychloroprene, poly(2,3-dimethylbutadiene), poly(butadiene-co-pentadiene), chlorosulfonated polyethylenes, polysulfide elastomers, block copolymers, made up of blocks of glassy or crystalline blocks such as polystyrene, poly(vinyltoluene), poly(t-butylstyrene), polyester and the like and the elastomeric blocks such as polybutadiene, polyisoprene, ethylene-propylene copolymers, ethylene-butylene copolymers, polyether ester and the like as for example the copolymers in poly(styrene-butadiene-styrene) block copolymer manufactured by Shell Chemical Company, Houston, Tex., under the trade designation "KRATON". Copolymers and/or mixtures of these aforementioned thermoplastic polymers can also be used.

Useful polymeric resins also include fluoropolymers, that is, at least partially fluorinated polymers. Useful fluoropolymers include, for example, those that are preparable (e.g., by free-radical polymerization) from monomers comprising chlorotrifluoroethylene, 2-chloropentafluoropropene, 3-chloropentafluoropropene, vinylidene fluoride, trifluoroethylene, tetrafluoroethylene, 1-hydropentafluoropropene, 2-hydropentafluoropropene, 1,1-dichlorofluoroethylene, dichlorodifluoroethylene, hexafluoropropylene, vinyl fluoride, a perfluorinated vinyl ether (e.g., a perfluoro(alkoxy vinyl ether) such as $CF_3OCF_2CF_2CF_2OCF=CF_2$, or a perfluoro(alkyl vinyl ether) such as perfluoro(methyl vinyl ether) or perfluoro(propyl vinyl ether)), cure site monomers such as for example nitrile containing monomers (e.g., $CF_2=CFO(CF_2)_LCN$, $CF_2=CFO[CF_2CF(CF_3)O]_q(CF_2O)_yCF(CF_3)CN$, $CF_2=CF[OCF_2CF(CF_3)]_rO(CF_2)_tCN$, or $CF_2=CFO(CF_2)_uOCF(CF_3)CN$ where L=2-12; q=0-4; r=1-2; y=0-6; t=1-4; and u=2-6), bromine containing monomers (e.g., $Z-R_f-O_x-CF=CF_2$, wherein Z is Br or I, $R_f$ is a substituted or unsubstituted $C_1-C_{12}$ fluoroalkylene, which may be perfluorinated and may contain one or more ether oxygen atoms, and x is 0 or 1); or a combination thereof, optionally in combination with additional non-fluorinated monomers such as, for example, ethylene or propylene. Specific examples of such fluoropolymers include polyvinylidene fluoride; copolymers of tetrafluoroethylene, hexafluoropropylene and vinylidene fluoride; copolymers of tetrafluoroethylene, hexafluoropropylene, perfluoropropyl vinyl ether, and vinylidene fluoride; tetrafluoroethylene-hexafluoropropylene copolymers; tetrafluoroethylene-perfluoro(alkyl vinyl ether) copolymers (e.g., tetrafluoroethylene-perfluoro(propyl vinyl ether)); and combinations of thereof.

Useful commercially available thermoplastic fluoropolymers include, for example, those marketed by Dyneon LLC, Oakdale, Minn., under the trade designations "THV" (e.g., "THV 220", "THV 400G", "THV 500G", "THV 815", and "THV 610X"), "PVDF", "PFA", "HTE", "ETFE", and "FEP"; those marketed by Atofina Chemicals, Philadelphia, Pa., under the trade designation "KYNAR" (e.g., "KYNAR 740"); those marketed by Solvay Solexis, Thorofare, N.J., under the trade designations "HYLAR" (e.g., "HYLAR 700") and "HALAR ECTFE".

Useful thermosetting polymeric resins include, for example, epoxy resins, alkyd resins, acrylic resins, one-part and two-part urethane resins, cyanate resins, phenolic resins, aminoplast resins, and combinations thereof. If a thermosetting resin is used, a suitable curative for that resin (e.g., a thermal curative and/or photocurative) may also be included with the polymeric resin.

Optionally, the first and/or second mixtures and/or nanocomposite may further contain one or more additives such as, for example, surfactants, flame proofing agents, fillers, ultraviolet absorbers, antioxidants, tackifier resins, colorants, fragrances, or antimicrobial agents.

Methods according to the present invention may be carried out in batch process or in a continuous manner.

Nanocomposites prepared according to the present invention are dispersions, typically an isotropic dispersion of exfoliated silicate platelets in the polymeric resin. The amount of exfoliated silicate platelets in the nanocomposite may be in any amount, but are typically in a range of from 0.1 to 10 percent by weight, more typically in a range of from 0.5 to 7 percent by weight, and even more typically in a range of from 1 to 5 percent by weight, inclusive, based on the total weight of the nanocomposite. Similarly, in some embodiments, the weight ratio of the exfoliated silicate platelets to the second layered silicate in the nanocomposite may be at least 1, 2, 3, 4, 5, 10, 50 or more, although lesser weight ratios may also be used.

The polymeric resin in the nanocomposite may be hardened, for example, by cooling in the case of thermoplastic resins, or by at least partially curing in the case of thermosetting polymeric resins.

Nanocomposites prepared according to the present invention are useful, for example, in the manufacture of barrier films or bottles, and flame retardant materials.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

The following abbreviations are used throughout the Examples:

| Abbreviation | Description |
| --- | --- |
| P(S-VP) | AB diblock copolymer, poly(styrene-block-4-vinylpyridine), synthesized using a stirred tubular reactor process generally as described in Example 1 of U.S. Pat. No. 6,448,353 (Nelson et al.), the disclosure of which is incorporated herein by reference; $M_n$ = 20 kg/mole; polydispersity index = 1.8; 95/5 weight ratio of styrene to 4-vinylpyridine monomeric units. |
| OC1 | Organically modified montmorillonite clay available under the trade designation "CLOISITE 20A" from Southern Clay Products (modified with methyl, tallow (~65% $C_{18}$; ~30% $C_{16}$; ~5% $C_{14}$), quaternary ammonium chloride; XRD analysis of OC1 as purchased showed a d-layer spacing of 2.41 nanometers (nm). |
| PS | Polystyrene, available under the trade designation "STYRON 615APR" from Dow Chemical Co., Midland, Michigan. |
| P(I-VP) | AB diblock copolymer, poly(isoprene-block-4-vinylpyridine), synthesized using a stirred tubular reactor process generally as described in Example 4 of U.S. Pat. No. 6,448,353 (Nelson |

-continued

| Abbreviation | Description |
| --- | --- |
| | et al.), the disclosure of which is incorporated herein by reference; $M_n$ = 30 kg/mole; polydispersity index = 2.1; 96/4 weight ratio of isoprene to 4-vinylpyridine monomeric units. |
| talc | Talc, available under the trade designation "CIMPACT 710" from Luzenac America, Englewood, Colorado. |
| kaolin | Kaolin clay, available from Aldrich Chemical Company. |
| THF | Tetrahydrofuran. |

The following procedures were used in the examples:

Film Preparation for XRD and TEM Analysis

Analysis via XRD and TEM was done on 1 mm thick films. To form the films, each material to be analyzed was placed between 0.051 mm thick untreated polyester liners, which in turn were placed between 2 aluminum plates (3.2 mm thick each) to form a stack. Two shims (1 mm thick each) were placed to either side of the stack such that upon pressing the assembled stack the mixture would not come into contact with either shim. Each stack was placed in a heated hydraulic press available under the trade designation "WABASH MPI MODEL G30H-15-LP" from Wabash MPI, Wabash, Ind. Both the top and bottom press plates were heated at 193° C. The stack was pressed for 1 minute at 1500 psi (10 MPa). The hot stack was then moved to a low-pressure water-cooled press for 30 seconds to cool the stack. The stack was disassembled and the liners were removed from both sides of the film disc that resulted from pressing the mixture.

X-Ray Diffraction (XRD)

Reflection geometry X-ray scattering data were collected using a four-circle diffractometer (available under the trade designation "HUBER (424/511.1)" from Huber Diffraktionstechnik GmbH, D83253 Rimsting, Germany), copper K-alpha radiation, and scintillation detector registry of the scattered radiation. The incident beam was collimated to a circular aperture of 0.70 mm. Scans were conducted in a reflection geometry from 0.5 to 10 degrees (2 theta) using a 0.05 degree step size and 10 second dwell time. A sealed tube X-ray source and X-ray generator settings of 40 kV and 20 mA were used. Data analysis and peak position definition were determined using X-ray diffraction analysis software available under the trade designation "JADE" from MDI, Inc., Livermore, Calif.

Transmission Electron Microscopy (TEM)

TEM was performed using a transmission electron microscope operated at 200 kV, available under the trade designation "JEOL 200CX" from JEOL USA, Peabody, Mass.

Molecular Weight and Polydispersity

Average molecular weight and polydispersity were determined by Gel Permeation Chromatography (GPC) analysis. Approximately 25 mg of a sample were dissolved in 10 milliliters (mL) of THF to form a mixture. The mixture was filtered using a 0.2-micron pore size polytetrafluoroethylene syringe filter. Then, about 150 microliters of the filtered solution were injected into a gel-packed column 25 cm long by 1 cm diameter available under the trade designation "PLGEL-MIXED B" from PolymerLabs, Amherst, Mass., that was part of a GPC system equipped with an autosampler and a pump. The GPC was system operated at room temperature using THF eluent that moved at a flow rate of approximately 0.95 mL/minute. A refractive index detector was used to detect changes in concentration. Number average molecular weight ($M_n$) and polydispersity index (PDI) calculations were calibrated using narrow polydispersity polystyrene controls ranging in molecular weight from 600 to $6 \times 10^6$ g/mole. The actual calculations were made with software (available under the trade designation "CALIBER" from Polymer Labs, Amherst, Mass.).

$^1$H NMR Spectroscopy

The relative concentration of each block was determined by $^1$H Nuclear Magnetic Resonance ($^1$H NMR) spectroscopy analysis. Specimens were dissolved in deuterated chloroform at a concentration of about 10 percent by weight and placed in a 500 MHz NMR Spectrometer available under the trade designation "UNITY 500 MHZ NMR SPECTROMETER" from Varian, Inc., Palo Alto, Calif. Block concentrations were calculated from relative areas of characteristic block component spectra.

The following general procedures are used in the examples:

General Procedure for Masterbatch Preparation

Continuous masterbatch preparation is accomplished using a high viscosity processor (HVP) available under the trade designation "LIST DISCOTHERM B6 HIGH VISCOSITY PROCESSOR" from List AG, Acton, Mass. The HVP has a horizontal, cylindrical body with a concentric agitator shaft. Mounted on the shaft (and extending perpendicular to the shaft) are disk elements having angled peripheral mixing-kneading bars and stationary hook-shaped bars mounted on the inside of the housing that interact with and clean the shaft and disk elements as they rotate. The HVP has a twin-screw discharge for material removal. The total volume of the HVP is 17.5 L, with a working volume of 12 L. The housing, shaft, and disk elements are all heated via a hot oil heating system. The heat transfer area in the reactor is 0.67 m$^2$. Temperature is controlled and monitored in three locations within the HVP: (1) the reactor entrance zone (zone 1), (2) the reactor intermediate zone (zone 2) and (3) the reactor exit zone (zone 3). A variable speed motor drives the agitator shaft at a maximum torque of 1200 Nm. A vacuum pump is attached to the reactor at the top of zone 2 for vapor removal.

The feed solution is fed into the HVP via a gear pump operating at 540 ml/minute. The HVP is heated at 165° C., at a vacuum setting of 70 torr. The main agitator shaft is stirred at a rate of 63 rpm and the discharge screw is run at 166 rpm. Temperatures within the HVP are: zone 1=100° C., zone 2=178° C., and zone 3=168° C.

General Procedure for Continuous Twin-Screw Extrusion

Continuous twin-screw extrusion is carried out using a co-rotating 25-mm twin-screw extruder (TSE) with 41:1 L/D, available under the trade designation "COPERION ZSK-25 WORLD LAB EXTRUDER" from Coperion, Ramsey, N.J. Barrel zones for the extruder are 4D (100 mm) in length. The extruder is operated at 320° F. (160° C.) with a screw speed of 300 rpm.

The TSE has a kneading section in barrel zone 4 for incorporating OC1 and/or P(S-VP) into molten PS resin after their addition to the extruder in barrel zone 3. This kneading section is 3D (i.e., 3 times the bore diameter) in length, incorporating high- and medium-shear-intensity forwarding kneading elements for dispersive mixing and a low shear-intensity, reversing kneading element for generating a melt seal and distributive mixing. A small atmospheric vent, 1D in length, at the beginning of barrel zone 5 is used to vent any entrapped air from the powder addition in barrel zone 3. Three downstream mixing sections are incorporated to add shear energy for dispersive and distributive mixing. A 3.5D mixing section spanned barrel zones 5 and 6, a 2.5D mixing section is utilized in barrel zone 7, and 3D mixing section spanned barrel zones 8 and 9. In all cases, medium- to low-shear-intensity, forwarding kneading elements and narrow-paddled, low-shear-intensity, reversing kneading elements are utilized to yield appropriate dispersive and distributive mixing. A vacuum of 52 torr (6.9 kPa) is pulled on a 2D (50 mm) vacuum vent in barrel zone 9 to remove any volatiles. In order to achieve thermal homogeneity and additional distributive mixing, a gear-type mixing element, under the trade designation "ZME" available from Coperion is utilized downstream of the vacuum vent. The temperature of the melt stream is monitored and recorded over the kneading sections in barrel zones 4 and 6, respectively, by immersion-depth thermocouples. Continuous extrusion of molten resin into zone 1 of the TSE is accomplished using a 1.25-inch (3.18-cm) single screw extruder (SSE) (available under the trade designation "KILLION KTS-125 SINGLE-SCREW EXTRUDER" from Davis-Standard; Pawcatuck, Conn.), equipped with a 3.0:1 compression general-purpose screw with 24 flights. Feeding of OC1 and/or P(S-VP) into a 2D (50 mm) port open to the atmosphere in barrel zone 3 of the twin-screw extruder is done using a gravimetric feeder equipped with twin auger screws, available under the trade designation "K-TRON GRAVIMETRIC FEEDER, MODEL KCLKT20" from K-Tron International, Pitman, N.J.

The extrudate from the TSE is metered through a 10.3 mL/revolution gear pump available under the trade designation "NORMAG" from Dynisco Extrusion, Hickory, N.C., and extruded through a ½-inch (1.3-cm) diameter pipe to form a strand. The strand was cooled at 8° C. in a water bath and pelletized.

Examples 1-4

Four separate feed solutions were made with varying amounts of P(S-VP) and OC1 in THF. The compositions of feed solutions 1-4 are reported in Table 1 (below).

TABLE 1

| Example | Feed Solution | Ratio of P(S-VP) to OC1 | PS-VP, kg | OC1, kg | THF, kg | XRD d-layer spacing, nm |
|---|---|---|---|---|---|---|
| 1 | 1 | 10:1 | 13.0 | 1.30 | 43.3 | 3.4 |
| 2 | 2 | 5:1 | 11.3 | 2.27 | 49.4 | 3.4 |
| 3 | 3 | 3:1 | 9.70 | 3.23 | 48.9 | 3.4 |
| 4 | 4 | 1:1 | 3.00 | 3.00 | 41.6 | 3.4 |

Feed solutions 1-4 were compounded into Masterbatches 1-4, respectively, according to the General Procedure for Masterbatch Preparation. In each case, a dry extrudate was obtained from the HVP and was pressed into a film and analyzed via XRD, which showed that more than 20 percent of the OC1 had been converted to other forms.

Examples 5-8

Masterbatches 1-4 were then compounded with additional PS according to the General Procedure for Continuous Twin-Screw Extrusion to form Nanocomposites 1-4 as reported in Table 2 (below).

TABLE 2

| Example | Nanocomposite | PS, kg/hr | Masterbatch | Masterbatch Feed Rate, kg/hr | Weight Ratio of PS/P(S-VP)/OC1 | Major Form of Layered Silicate |
|---|---|---|---|---|---|---|
| 5 | 1 | 3.06 | 1 | 3.74 | 45/50/5 | exfoliated silicate platelets |
| 6 | 2 | 4.76 | 2 | 2.0 | 70/25/5 | exfoliated silicate platelets |
| 7 | 3 | 5.44 | 3 | 1.4 | 80/15/5 | exfoliated silicate platelets |
| 8 | 4 | 6.12 | 4 | 0.68 | 90/5/5 | exfoliated silicate platelets |

XRD and TEM analysis confirmed the exfoliated nature of Nanocomposites 1-4 (e.g., d-layer spacing was observable by XRD analysis and exfoliated silicate platelets were evident by TEM). Representative TEM micrographs of Nanocomposites 1-4 are shown in FIGS. 2-5, respectively.

Example 9

A slurry was prepared with P(S-VP), OC1, and acetone. The slurry composition is shown in Table 4 (below).

TABLE 4

| Feed Solution | P(S-VP), g | Clay | Clay, g | Acetone, g | Initial d-Layer spacing, nm | Composite d-Layer spacing, nm |
|---|---|---|---|---|---|---|
| 5 | 90.0 | OC1 | 10.0 | 11.1 | 2.4 | 3.5 |

The slurry was devolatilized and compounded in the batch vacuum kneader of Comparative Example D. The kneader was heated to 160° C. and held at a vacuum of 150 torr (20 kPa). The agitators were stirred at a rate of 50 rpm. The resultant composite was mixed and devolatilized for 45 minutes. The batch process was able to remove the solvent and compound the P(S-VP) and OC1 clay. The composite was pressed into a film and analyzed via XRD. The initial d-layer spacing of the clay itself and the final composite d-layer spacing are shown in Table 4. There was no apparent collapsed clay as judged by XRD.

Comparative Example A

Ground P(S-VP) was metered into zone 1 of the TSE used in the General Procedure for Continuous Twin-Screw Extrusion using a gravimetric feeder at a rate of 3.4 kg/hr. The P(S-VP) was allowed to melt in the first two zones of the extruder. At zone 3, OC1 was added using a gravimetric feeder at a rate of 3.4 kg/hr. The resultant Masterbatch A had a 1:1 weight ratio of P(S-VP):OC1. Masterbatch A was extruded, pelletized, and analyzed by XRD whereby it was found to have a d-layer spacing of 3.65 nm.

Masterbatch A was let down in PS according to the General Procedure for Continuous Twin-Screw Extrusion wherein: PS was melted and fed into the twin screw extruder via a single screw extruder at a rate of 6.12 kg/hr; pelletized Masterbatch A was fed into zone 3 at a rate of 0.68 kg/hr. The resultant extrudate had a 90:5:5 weight ratio of PS:P(S-VP):OC1. A portion of the extrudate was pressed into a film and analyzed via XRD, which showed the organoclay in the extrudate had a d-layer spacing of 3.82 nm.

Comparative Example B

One kg of P(S-VP) was dissolved in 13.5 kg of THF. One kg of OC1 was added to this solution. The solution was dried in a batch vacuum oven at 110° C. for 12 hours until all the THF had been removed. The resultant Masterbatch B had a 1:1 weight ratio of P(S-VP):OC1. A portion of Masterbatch B was pressed into a film and analyzed via XRD, which showed a d-layer spacing of 3.35 nm.

Masterbatch B was the let down in PS according to the General Procedure for Continuous Twin-Screw Extrusion wherein: PS was melted and fed into the TSE at a rate of 6.12 kg/hr; and Masterbatch B was fed into zone 3 at a rate of 0.68 kg/hr. The resultant extrudate had a 90:5:5 weight ratio of PS:P(S-VP):OC1. A portion of the extrudate was analyzed via XRD and TEM, which showed the organoclay in the extrudate had a d-layer spacing of 3.32 nm, but TEM showed it was not exfoliated.

Comparative Example C

Figure 6:
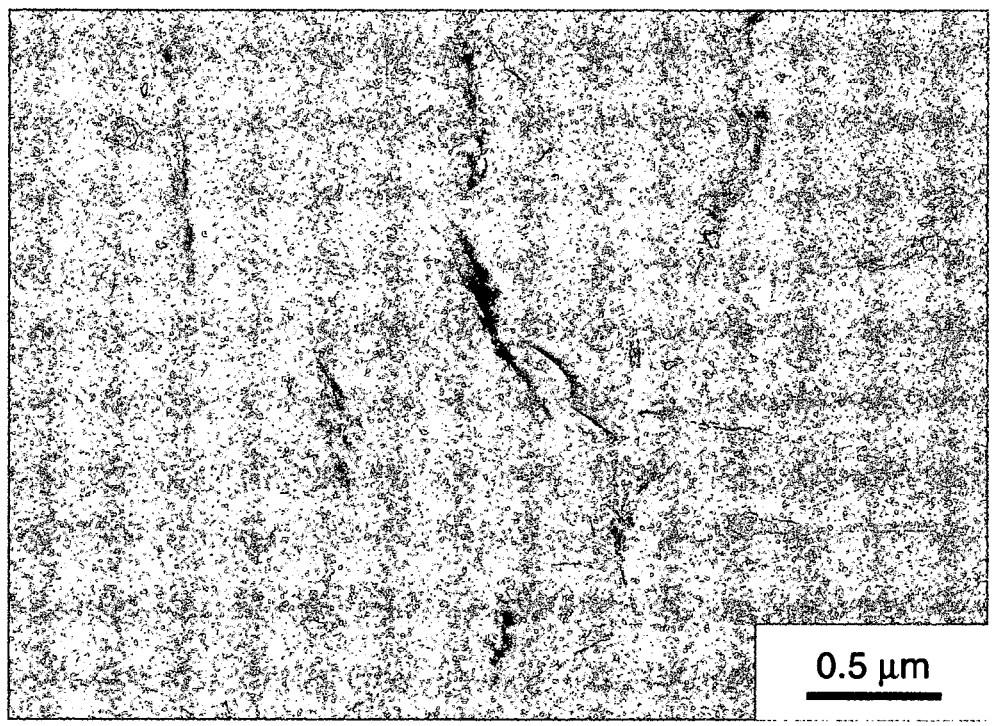
FIGS. 6-7 are TEM micrographs of the composite of Comparative Example C.
Figure 7:
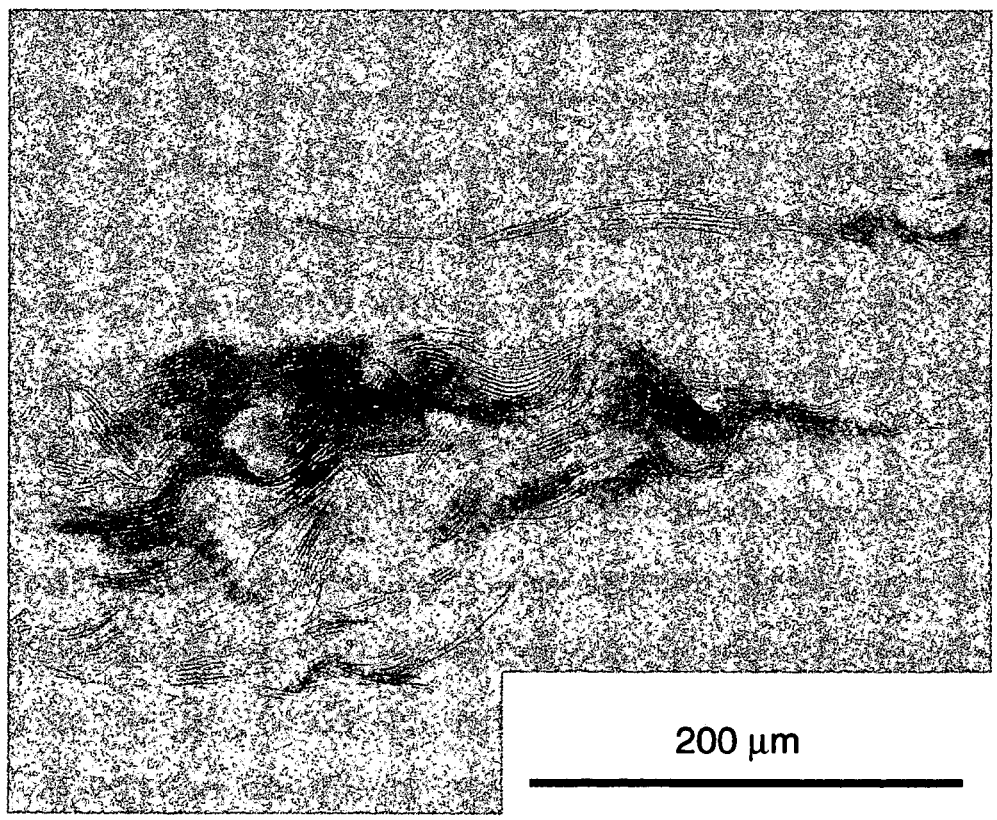

OC1 was compounded with PS in a twin-screw extruder as in Example 1, except that the PS:OC1 weight ratio was 95:5. TEM analysis confirmed the non-exfoliated nature of these composites. Representative TEM micrographs of the composite illustrating the non-exfoliated nature are shown in FIGS. 6-7.

Comparative Examples D-E

Two feed solutions were prepared with P(I-VP). One solution (Feed Solution D1) was made with talc in THF, and the other (Feed Solution E1) was made with kaolin clay in THF using the amounts reported in Table 3 (below).

TABLE 3

| Feed Solution | P(I-VP), g | Clay | Clay, g | THF, g | d-Layer Spacing of Clay, nm | Devolatilized Mixture d-Layer spacing, nm |
|---|---|---|---|---|---|---|
| D1 | 105 | talc | 10.5 | 315 | 1.90 | 1.90 |
| E1 | 105 | kaolin | 10.5 | 315 | 0.71 | 0.71 |

Each feed solution was devolatilized and compounded in a batch vacuum kneader (BVP). The BVP was obtained under the trade designation "MKD 0,6-H60 IKAVISC MEASURING KNEADER" from IKA Labortechnik Gmbh & Co. KG, D-79219 Staufen, Germany. The BVP had a kneading trough that held 600 mL and had a working volume of 300 mL. The bottom of the trough was double walled allowing the batch to be heated via a hot oil circulator. Kneading was accomplished with two kneading paddles fixed to the motor that mixed both horizontally and vertically. The paddles continually wiped the walls and each other. In the lid of the BVP was a port from which a vacuum could be established and liquid could be introduced. A DC motor with a constant power output of 160 W was mounted downstream from a gear assembly that was capable of transmitting a torque of 60 Nm to drive the paddles. The BVP was heated at 120° C. and held at a vacuum of 25 torr (3.3 kPa) while the main agitator shaft rotated at 63 rpm. Feed Solutions D1 and E1 were allowed to devolatilize and mix for 45 minutes in the BVP, resulting in Mixtures D1 and E1, respectively, which were pressed into films and analyzed via XRD. Results of XRD measurements on the mixtures 1 and E1 are reported in Table 3.

Various modifications and alterations of this invention may be made by those skilled in the art without departing from the scope and spirit of this invention, and it should be understood that this invention is not to be unduly limited to the illustrative embodiments set forth herein.

What is claimed is:

1. A method of making a composition, the method comprising:

mixing components comprising a first layered silicate having a first d-layer spacing, a block copolymer having at least one block that is capable of intercalating the first layered silicate, and a solvent to provide a first mixture, wherein the first mixture contains from at least 10 percent by weight of the solvent, based on the total weight of the first mixture;

kneading the first mixture under vacuum using a vacuum kneader while removing the solvent from the first mixture to provide a second mixture comprising from about 0.2 to about 0.5 percent by weight of the solvent, based on the total weight of the second mixture, the kneading comprising contacting the first mixture with a kneading member, wherein the second mixture comprises the block copolymer having dispersed therein at least one of:

a) a second layered silicate having a second d-layer spacing resulting from intercalation of the first layered silicate by the block copolymer, the second d-layer spacing being greater than the first d-layer spacing; or b) exfoliated silicate platelets.

2. A method according to claim 1, wherein the solvent does not swell the first layered silicate.

3. A method according to claim 1, wherein the total amount of the second layered silicate and exfoliated silicate platelets comprises at least 30 percent by weight of the second mixture.

4. A method according to claim 1, wherein the total amount of the second layered silicate and exfoliated silicate platelets comprises at least 40 percent by weight of the second mixture.

5. A method according to claim 1, wherein the total amount of second layered silicate and exfoliated silicate platelets comprises at least 50 percent by weight of the second mixture.

6. A method according to claim 1, wherein the total amount of second layered silicate and exfoliated silicate platelets comprises at least 60 percent by weight of the second mixture.

7. A method according to claim 1, wherein the method is carried out in a continuous manner.

8. A method according to claim 1, wherein the block copolymer comprises a diblock copolymer.

9. A method according to claim 1, wherein the block copolymer comprises a highly fluorinated block.

10. A method according to claim 1, wherein the block copolymer is selected from the group consisting of poly(styrene-block-4-vinylpyridine), poly(styrene-block-isoprene-block-4-vinylpyridine), poly(styrene-block-butadiene-block-4-vinylpyridine), poly(isoprene-block-4-vinylpyridine), poly(butadiene-block-4-vinylpyridine), hydrogenated versions of poly(butadiene-block-4-vinylpyridine), poly(styrene-block-isoprene-block-4-vinylpyridine), poly(styrene-block-butadiene-block-4-vinylpyridine), and poly(isoprene-block-4-vinylpyridine).

11. A method according to claim 1, wherein the layered silicate comprises montmorillonite, nontronite, bentonite, beidellite, hectorite, saponite, sauconite, fluorohectorite, stevensite, volkonskoite, magadiite, kenyaite, halloysite, hydrotalcite, a synthetic layered silicate, or a combination thereof.

12. A method according to claim 1, wherein the layered silicate comprises an organoclay.

13. A method according to claim 1, further comprising mixing the second mixture with a polymeric resin to provide a nanocomposite, wherein the nanocomposite comprises a exfoliated silicate platelets dispersed in the polymeric resin.

14. A method according to claim 13, wherein the method is carried out in a continuous manner.

15. A method according to claim 13, wherein the polymeric resin comprises a thermoplastic resin.

16. A method according to claim 13, wherein the polymeric resin comprises a thermosetting resin.

17. A method according to claim 13, wherein the polymeric resin comprises an elastomeric resin.

18. A method according to claim 13, wherein the polymeric resin comprises a polyolefin, polyurethane, polyamide, fluoropolymer, polyimide, polycarbonate, polyester, polysulfone, polylactone, polyacetal, acrylonitrile copolymer, polyphenylene oxide, polyphenylene sulfide, polystyrene, aromatic polyketone, or a combination thereof.

19. A method according to claim 13, wherein the polymeric resin comprises a polyolefin.

20. A method according to claim 13, wherein the weight ratio of the polymeric resin to the block copolymer is in a range of 20 to 200, inclusive.

21. A method according to claim 13, wherein the weight ratio of the exfoliated silicate platelets to the second layered silicate in the nanocomposite is at least one.

22. A method according to claim 13, wherein the exfoliated silicate platelets are contained in the nanocomposite in an amount of from 1 to 5 percent by weight, inclusive, based on the total weight of the nanocomposite.

* * * * *

UNITED STATES PATENT AND TRADEMARK OFFICE
CERTIFICATE OF CORRECTION

| | | |
|---|---|---|
| PATENT NO. | : 7,691,932 B2 | Page 1 of 1 |
| APPLICATION NO. | : 10/950834 | |
| DATED | : April 6, 2010 | |
| INVENTOR(S) | : James M. Nelson | |

It is certified that error appears in the above-identified patent and that said Letters Patent is hereby corrected as shown below:

<u>On the First Page, in Column 2, under (Other Publications)</u>
    Line 4, delete "Thermao," and insert -- Thermal, --, therefor.

<u>Column 13</u>
    Line 51, delete "LID," and insert -- L/D, --, therefor.

Signed and Sealed this

Fifteenth Day of June, 2010

David J. Kappos
*Director of the United States Patent and Trademark Office*